United States Patent [19]

Ponce de Leon

[11] 4,138,824
[45] Feb. 13, 1979

[54] CENTER LOCATOR

[76] Inventor: Ronald R. Ponce de Leon, 5112 Sepulveda Blvd., Sherman Oaks, Calif. 91403

[21] Appl. No.: 772,257

[22] Filed: Feb. 25, 1977

[51] Int. Cl.² ............... B27G 23/00; G01B 5/24; G01C 9/00; G01C 9/06
[52] U.S. Cl. ............... 33/185 R; 33/169 C; 33/172 D; 33/366; 33/390
[58] Field of Search ............... 33/172 D, 169 C, 332, 33/185 R, 366, 371

[56] References Cited

U.S. PATENT DOCUMENTS

| 2,146,906 | 2/1939 | Möller | 33/286 X |
|---|---|---|---|
| 2,366,430 | 1/1945 | Benton | 33/286 |
| 2,510,475 | 6/1950 | Poer | 33/286 X |
| 2,557,029 | 6/1951 | Griffin | 33/286 X |
| 2,580,674 | 1/1952 | Griffin | 33/286 |
| 3,096,655 | 7/1963 | Peterson | 33/366 X |
| 3,432,932 | 3/1969 | Oellerich et al. | 33/172 D |

FOREIGN PATENT DOCUMENTS

| 544175 | 7/1957 | Canada | 33/371 |
|---|---|---|---|
| 430148 | 6/1935 | United Kingdom | 33/172 D |

Primary Examiner—Richard E. Aegerter

[57] ABSTRACT

A precision tool is disclosed herein for locating the center of a workpiece having a shaft detachable coupled to the spindle or chuck of a drill press. Downwardly depending from the shaft is a housing enclosing either an electro-mechanical pendulum or an optical device having a bubble target. A holder is provided for the workpiece so that the workpiece may be positioned until the target lies along the central longitudinal axis of the pendulum or the optical axis whereby the workpiece is centered with respect to the spindle or chuck of the drill press.

3 Claims, 4 Drawing Figures

CENTER LOCATOR

BACKGROUND OF THE INVENTION

1. Field of the Invention

This invention relates to the field of workpiece centering devices and more particularly to a novel center locator incorporating optical or electro-mechanical components adapted to register with target elements carried on the workpiece whereby exact centering of the workpiece is achieved with respect to a cutting tool.

2. Brief Description of the Prior Art

In the past, it has been difficult to accurately locate the center of a workpiece intended to be worked on by a cutting tool. For example, when it is desired to drill a hole in a workpiece, the workpiece is held by a holder underneath a drill press and the cutting tool, such as a drill, is lowered into cutting relationship with the workpiece. It is imperative that the cutting tool be properly aligned with the workpiece so that the point of the drill is aligned on the center axis of the workpiece hole which is intended to be drilled.

A dial indicator is used with a rod in rotation to the chuck or spindle. The indicator uses a quill for sweeping the wall of the hole. The table or work is moved in X and Y directions until the indicator reaches "0" or null.

Some attempts have been made to provide a center locator device which may be referred to as a "plumb-type" wherein a weighted object is carried on the end of a line or wire so that gravity positions the weighted device directly over the workpiece for center location. Such devices are operable for their intended purpose; however, difficulties and problems have been encountered with such devices that stem largely from the fact that the string or wire cannot be accurately located at the point of the cutting tool so that the exact center on the workpiece can be located. Usually, the string or wire is attached off to one side whereby the center is offset from that which is actually desired. The offset tends to confuse the workmen and inaccurately cut workpieces result. Thus, inefficiency waste and loss of time and material results from the use of conventional plumb-type center locators. Such locators are acceptable for construction and building fields such as in the construction and building field, but where accuracy and precision is required, such devices are totally inadequate.

Therefore, a long standing need has existed to provide an accurate center locator which may be rapidly attached to a tool for locating the center of a workpiece.

SUMMARY OF THE INVENTION

Accordingly, the above problems and difficulties are obviated by the present invention which provides a novel center locator having a shaft detachably coupled to a tool holder such as a chuck or spindle and wherein a housing is downwardly depending therefrom for containing an electro-mechanical pendulum mechanism or an optical arrangement wherein a precision center line is produced coaxially disposed with respect to the center of the chuck or spindle. A target component or element is carried by the workpiece wherein the workpiece may be moved so that the target is in registry or indexed with respect to the center line established by the electro-mechanical mechanism or the optical apparatus. When coincidence has occurred between the center line and the center of the target, the center of the workpiece intended to be worked on is established.

Therefore, it is among the primary objects of the present invention to provide a novel apparatus or device for accurately determining the location of the center of a workpiece intended to be cut by a cutting tool.

Another object object of the present invention resides in the provision of a novel center locator having electro-mechanical means for determining the center of a cut to be made in a workpiece.

A further object of the present invention is to provide a novel center locator having optical means for establishing an optical center line for cooperating with a target carried by a workpiece so that the center of a cut to be made on the workpiece may be readily located.

Still a further object of the present invention is to provide a novel center locator for a workpiece which is relatively inexpensive to manufacture and one that may be readily used by relatively unskilled workmen.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
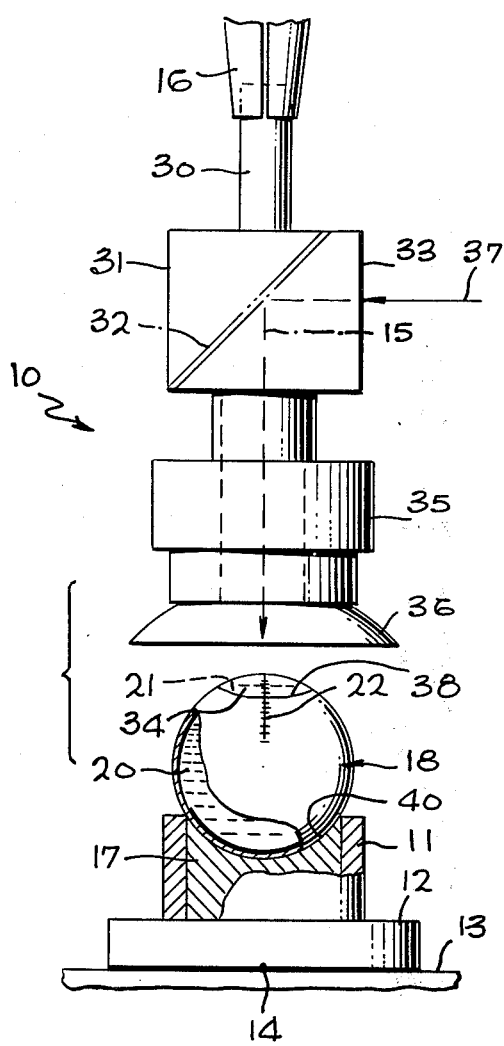
FIG. 1 is a side elevational view of the novel center locator of the present invention incorporating optical means for establishing a center line in cooperation with a bubble target so that the center of a workpiece may be located.

Referring to FIG. 1, the novel center locator of the present invention is illustrated in the general direction of arrow 10 wherein the locator is intended to find the center of a workpiece or part identified by numeral 11. Preferably, the part 11 is a circular sleeve or cylinder and includes a mounting or base 12 serving as a holder so that the workpiece 11 may be moved about a flat table 13. As an illustration of application of the subject invention, the object of the present invention is to locate the center point indicated by the numeral 14 and it is a further requirement that the center point 14 be located on a central longitudinal axis identified by the numeral 15. The longitudinal axis 15 is parallel and coextensive of an axis running through a tool chuck or spindle 16 normally intended to hold a tool such as a cutting drill. Therefore, it can be seen that when the tool is located in the chuck 16, the tip or point of the tool must be directly on the center point 14 in order to accurately and, with precision, place a hole on the part 11, its support or base 12 or merely to locate a hole in the structure of the support indicated by a numeral 17. Therefore, the workpiece may take the form of a collar 11, a flat plate 12 or a plate 12 having a central core 17.

In any event, the workpiece 11 is provided with a target 18 taking the form of a ball filled with a fluid such as water 20. The water 20 defines an air bubble 21 which always remains at the top of the glass bulb. For accuracy in determining angular displacement or relationship, a graduated scale 22 is provided on the outside of the bulb commencing at the top of the bulb directly over the bubble 21.

An optical means is provided for aligning the central axis of the tool driving chuck or spindle 16 with the target 18 and in particular, the center of the bubble 21. The optical means comprises a shaft 30 which is detachably connected to the chuck 16 and downwardly depends therefrom so as to support a reflector housing 31 which contains a mirror 32 arranged at a forty five degree angle with respect to the central axis 15. The reflector housing includes a viewing port 33 wherein the users eye may see the reflection via a magnifying stage of the target 18 and the circular perimeter of the bubble 21 in particular. For accuracy, a circle 34 indicates the circular edge of the bubble 21. A magnifying means with concentrics circles is contained within the housing 35 so that sight of the bubble's edge and of a scribed circle 38 is made easier to view by the user. A clear plastic shield 36 augments the viewer's ease and comfort by preventing extraneous light from reaching the bubble area of the target 18.

Figure 2:
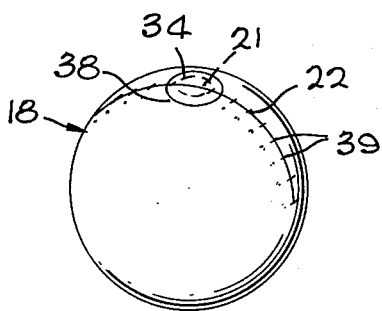
FIG. 2 is a perspective view of the bubble target employed in the device shown in FIG. 1.

Therefore, it can be seen that the user's eye is directed along horizontal axis 37 to the angular mirror 32. The image of the bubble's circular perimeter 34 is then visible and the holder 12 for the part 11 may be moved manually until the circular edge of the bubble indicated by circle 34 is in alignment with a circle 38 inscribed on the bulb. When this occurs, coaxial alignment is assured. FIG. 2 also shows the graduations of the scale along the line 22 and such a graduation is indicated by numeral 39.

When the spindle or chuck of the tool has been so centered, the chuck may be opened and shaft 30 removed from the chuck. The target 18 may also be removed from its setting in the concave seat 40 provided on the core of the support or holder 12. It is to be understood that the core need not be present since the ball or bulb 18 may rest on the inner edge of the circular hole defined by the continuous sidewall of the circular part 11. Once the optical device has been removed and the target has been removed, a cutting tool such as a drill may be placed in the chuck 16 and the tip of the drill will be aligned along the longitudinal axis 15 directly in alignment with the center of the now removed target (bubble). A hole may be drilled or the center of the circular part may be thusly located.

Defined in angular displacement, the bubble is located within the target circle 38 and the circular edge 34 as previously described. When so located, the tool holder can then be moved (or alternately the target may be rotated) to locate the desired degree or angle with respect to the line 39 marking on the graduated scale 22.

Figure 3:
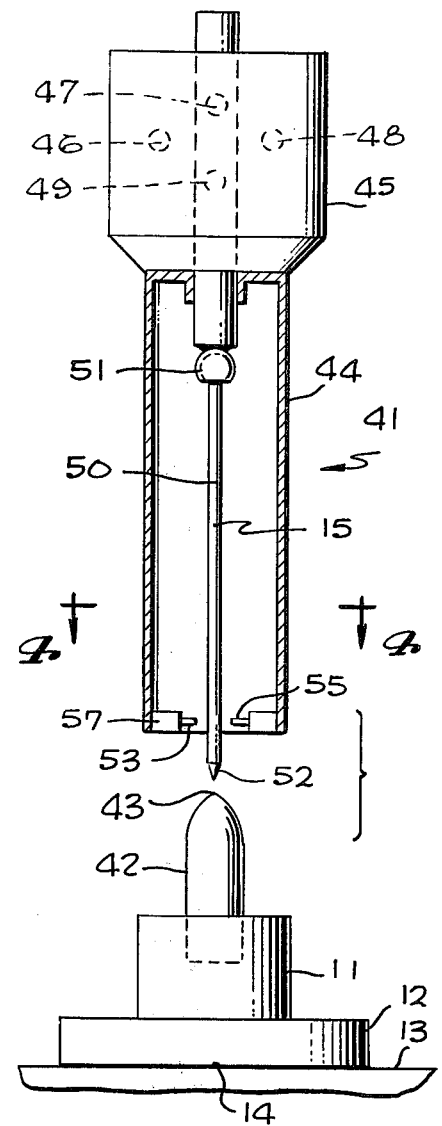
FIG. 3 is a side elevational view, partly in section, of a novel center locator incorporating an electro-mechanical means cooperating with a pointed target for establishing the center of a workpiece intended to be cut.
Figure 4:
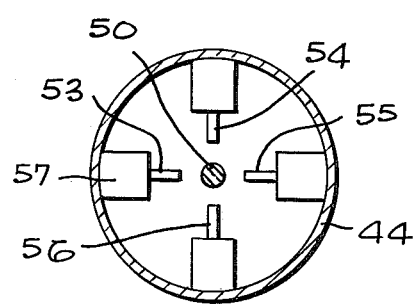
FIG. 4 is a transverse cross-sectional view taken in the direction of arrows 4—4 of FIG. 3 showing the internal sensing components of the electro-mechanical mechanism or means.

Referring to FIGS. 3 and 4, another embodiment of the present invention is illustrated wherein the alignment mechanism takes the form of an electro-mechanical arrangement and the device is illustrated in the general direction of arrow 41. It can be seen that the workpiece 11 is mounted on a holder 12 which may be positioned on the surface of the table 13. It is the object of the device to locate the center point 14 as previously described. In this connection, the fluid bulb 18 has been replaced by a pointer 42 which is elongated and mounted in the center of the part 11 so that a center point 43 is coaxially disposed with respect to the center of the part 11. Therefore, it is an object to locate the electro-mechanical device along the center line 15 so that the center point 43 is coextensive and coaxially disposed with respect thereto.

The electro-mechanical mechanism includes a housing 44 which is downwardly depending from an enlarged top portion 45 that houses an electrical circuit for operating a plurality of lights such as the four lights numbered 46–49 inclusive. The lights 46–49 inclusive provide a visual display for centering the workpiece 11 on its mount 12 so that the user knows the position of the workpiece with respect to the center line 15. The user knows that when no lights are energized, exact center location has been reached so that the center 14 is in coextensive alignment with the point 43 and the longitudinal center line 15.

In addition to the visual display for the convenience of the user, the electro-mechanical mechanism further includes a swingable pendulum 50 which downwardly depends from a universal socket 51. The pendulum 50 is an elongated pointer terminating in a tip 52 which projects outside of the housing 44 so that the user has the opportunity of visually aligning the tip 52 with the point 43. The terminating end adjacent to the tip 52 passes between a set of four contacts in one embodiment or micro-switches in another embodiment such as illustrated in FIG. 4 by the numerals 53–56 inclusive. Each of the respective contacts is arranged to operate a contact closure such as the closure or microswitch 57 in connection with the contact 53. The closures or microswitches are in turn connected to each of the display lights 46–49 inclusive so that when the pendulum 50 swings against one or more of the contacts, the light corresponding to each of the respective contacts will energize. A battery is connected between the closures or microswitches and the lights to achieve energization of the lights when the pointer so strikes a particular closure or microswitch.

In the alternative, the microswitches may be replaced with electrical contacts and the pointer may be charged so that a circuit is complete when the pendulum strikes the contact. Also, magnets may also be employed for making a magnetic contact.

It is also envisioned that the target 42 may be composed of magnetic materials so that it will attract the steel rod or pendulum 50. The rod will make contact with the microswitches and as the part support 12 is moved on the surface 13 or in the event the tool holder including the chuck 16 is moved till such a time as when all the lights are extinguished, then at this time the tool will be in perfect alignment with the index point 14. As previously described, the point 52 may be visually aligned with the point 43; however, in actual practice it is preferred that the target 42 be composed of magnetic material so that visual orientation of the target with respect to the pendulum will not be required.

In view of the foregoing, it can be seen that the center locator device of the present invention provides a novel means for accurately locating a center point or index point so that a cutting tool may be placed in alignment therewith. Either optical or electro-mechanical means are provided for achieving the alignment and alignment may take place with either visual or non-visual observance by the user. The device is relatively inexpensive when constructed in either of its forms and may be readily operated by an artisan having ordinary skill.

While particular embodiments of the present invention have been shown and described, it will be obvious to those skilled in the art that changes and modifications may be ade without departing from this invention in its broader aspects and, therefore, the aim in the appended claims is to cover all such changes and modifications as fall within the true spirit and scope of this invention.

What is claimed is:

1. A device for locating a predetermined point on a workpiece so that it is in alignment with a given point on a cutting tool, the combination comprising:
   a tool holder having a releasable chuck for holding said cutting tool;
   a workpiece holder for moveably supporting said workpiece;
   a target means carried on said workpiece holder having a center point carried thereon;
   a centering means downwardly depending from said tool holder in the absence of said cutting tool and said centering means having means for establishing a central longitudinal axis coinciding and coextensive with a central axis of said tool holder;
   indicating means carried on said centering means for displaying registry between said target means center point and said centering means central longitudinal axis whereby said tool holder axis is indexed with and in alignment with said predetermined point on said workpiece;
   said centering means is an electro-mechanical means including a pendulum swingable within a housing; and
   at least four electrical contact elements operably connected to a similar number of lights operable to display offset pendulum swing from said central longitudinal axis.

2. The invention as defined in claim 1 wherein
   said pendulum includes a pointed tip projecting from the bottom of said housing;
   said target means comprising an elongated element terminating in said center point intended to be held in coaxial registry with said pendulum tip.

3. The invention as defined in claim 2 wherein
   said elongated element is composed of magnetic material and said pendulum is composed of a ferrous material.

* * * * *